(12) United States Patent
Ritter et al.

(10) Patent No.: US 11,420,565 B2
(45) Date of Patent: Aug. 23, 2022

(54) CARGO DIVIDER ASSEMBLY FOR A VEHICLE

(71) Applicant: Ford Global Technologies, LLC, Dearborn, MI (US)

(72) Inventors: Ryan Ritter, Canton, MI (US); Jedidiah Paul Durkin, Detroit, MI (US); Nancy B. Reppenhagen, Livonia, MI (US); Rodrigo Pérez Salinas, Tlalnepantla de Baz (MX); Jorge Adolfo Miranda Nieto, Leon (MX)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 17/126,318

(22) Filed: Dec. 18, 2020

(65) Prior Publication Data
US 2022/0194300 A1    Jun. 23, 2022

(51) Int. Cl.
*B60R 5/04*    (2006.01)
(52) U.S. Cl.
CPC ..................... *B60R 5/04* (2013.01)
(58) Field of Classification Search
CPC ........ B60R 11/06; B60R 13/013; B60R 5/04; B60R 5/05; B60R 5/045; B60P 7/14
USPC ............................ 296/37.5, 24.43
See application file for complete search history.

(56) References Cited

U.S. PATENT DOCUMENTS

| | | | |
|---|---|---|---|
| 5,669,537 A | 9/1997 | Saleem et al. | |
| 6,502,886 B1 * | 1/2003 | Bleau | B60R 7/02 296/37.16 |
| 6,733,060 B1 | 5/2004 | Pavkov et al. | |
| 6,752,304 B1 | 6/2004 | Hotary et al. | |
| 7,118,151 B2 * | 10/2006 | Bejin | B60R 5/04 296/37.6 |
| 9,260,898 B2 * | 2/2016 | Soma | E05D 7/1055 |
| 10,053,024 B2 * | 8/2018 | Simard | B60P 7/135 |
| 10,065,564 B2 * | 9/2018 | Romero Contreras | B60R 7/02 |
| 10,196,008 B2 * | 2/2019 | Ranka | B60R 13/013 |
| 2009/0039679 A1 * | 2/2009 | Karagitz | B60R 5/04 296/193.07 |
| 2015/0251712 A1 * | 9/2015 | Craven | B60R 5/04 296/37.2 |
| 2017/0050579 A1 * | 2/2017 | Ranka | B60R 11/06 |

(Continued)

FOREIGN PATENT DOCUMENTS

| | | |
|---|---|---|
| DE | 102006009769 A1 | 9/2007 |
| DE | 10261393 B4 | 4/2016 |

(Continued)

*Primary Examiner* — Pinel E Romain
(74) *Attorney, Agent, or Firm* — Vichit Chea; Price Heneveld LLP

(57) ABSTRACT

A cargo divider assembly for a cargo area of a vehicle includes a storage compartment defined within the cargo area, first and second receiving slots defined within the storage compartment, and a lid. The lid is operable between a cover position, wherein the lid covers the storage compartment, a first divider position, wherein the lid is received within the first receiving slot and extends a first distance into the storage compartment, and a second divider position, wherein the lid is received within the second receiving slot and extends a second distance into the storage compartment that is greater than the first distance.

20 Claims, 9 Drawing Sheets

(56) References Cited

U.S. PATENT DOCUMENTS

2019/0118692 A1* 4/2019 Qiu .................. B60L 50/50
2020/0101902 A1 4/2020 Ngo

FOREIGN PATENT DOCUMENTS

| DE | 102019213462 A1 * | 3/2021 |
| ES | 2537931 A1 | 6/2015 |

* cited by examiner

CARGO DIVIDER ASSEMBLY FOR A VEHICLE

FIELD OF THE DISCLOSURE

The present disclosure generally relates to a cargo divider assembly for a vehicle. More specifically, the present disclosure relates to a cargo divider assembly for a vehicle that includes a lid operable to cover a storage compartment in a cover position and divide the storage compartment in one or more divider positions.

BACKGROUND OF THE DISCLOSURE

Vehicles typically include an area to stow cargo, such as a trunk. A vehicle cargo area that includes an enhanced storage solution may be desired.

SUMMARY OF THE DISCLOSURE

According to a first aspect of the present disclosure, a cargo divider assembly for a cargo area of the vehicle includes a cargo area floor. The cargo area floor includes an upper platform and a recessed portion that defines a storage compartment adjacent to the upper platform. The recessed portion includes a base and a side wall that extends vehicle-upward from the base. The side wall defines first and second receiving slots. A lid is operable between a cover position, wherein the lid covers the storage compartment, a first divider position, wherein the lid is received within the first receiving slot and extends a first distance into the storage compartment, and a second divider position, wherein the lid is received within the second receiving slot and extends a second distance into the storage compartment that is greater than the first distance.

Embodiments of the first aspect of the present disclosure may include any one or a combination of the following features:
- the first receiving slot terminates at a first slot bottom and the second receiving slot terminates at a second slot bottom;
- the first slot bottom is further than the second slot bottom from the base of the recessed portion;
- the second slot bottom is disposed vehicle-upward of the base of the recessed portion;
- the first receiving slot extends from the first slot bottom to an upper shelf that is configured to support the lid in the cover position;
- the upper shelf is disposed further vehicle-downward than the upper platform;
- the upper platform aligns with a top side of the lid in the cover position of the lid;
- a trim cover overlies the upper platform of the cargo area floor, wherein the trim cover aligns with a top side of the lid in the cover position of the lid;
- the lid includes a top side and a bottom side opposite the top side, and the top side is positioned vehicle-upward from the bottom side and the cover position of the lid, at least a portion of the top side faces the base of the recessed portion in the first divider position, and the bottom side faces away from the base of the recessed portion in the first divider position; and
- the cargo area is a front trunk of the vehicle.

According to a second aspect of the present disclosure, a cargo divider assembly for the cargo area of a vehicle includes a storage compartment that is defined within the cargo area. First and second receiving slots are defined within the storage compartment. A lid is operable between a cover position, wherein the lid covers the storage compartment, a first divider position, wherein the lid is received within the first receiving slot and extends a first distance into the storage compartment, and a second divider position, wherein the lid is received within the second receiving slot and extends a second distance into the storage compartment that is greater than the first distance.

Embodiments of the second aspect of the present disclosure may include any one or a combination of the following features:
- the storage compartment is defined by a recessed portion of a cargo area floor that comprises a base and a side wall extending vehicle-upward from the base, wherein the first and second receiving slots are defined by the side wall;
- the cargo area floor further comprises an upper platform adjacent to the recessed portion; and
- the first receiving slot terminates at a first slot bottom and the second receiving slot terminates at a second slot bottom, wherein the first slot bottom is further than the second slot bottom from the base of the recessed portion.

According to a third aspect of the present disclosure, a cargo divider assembly for a cargo area of a vehicle includes a storage compartment that is defined within the cargo area. A first receiving slot is defined within the storage compartment. A lid has a top side and a bottom side. The lid is operable between a cover position, wherein the lid covers the storage compartment and the top side is disposed vehicle-upward of the bottom side, and a first divider position, wherein the lid is received within the first receiving slot, extends a first distance into the storage compartment, and is oriented at an angle such that one of the top side and the bottom side faces a first vehicle-downward direction.

Embodiments of the third aspect of the present disclosure may include any one or a combination of the following features:
- the first vehicle-downward direction includes one of a vehicle-rearward component and a vehicle-forward component;
- a second receiving slot is defined within the storage compartment, wherein the lid is operable between the cover position, the first divider position, and a second divider position, wherein the lid is received within the second receiving slot and extends a second distance into the storage compartment;
- the second distance is greater than the first distance;
- in the second divider position, the lid is angled such that one of the top side and the bottom side faces a second vehicle-downward direction; and
- the top side faces the first vehicle-downward direction in the first divider position, and the bottom side faces the second vehicle-downward direction in the second divider position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
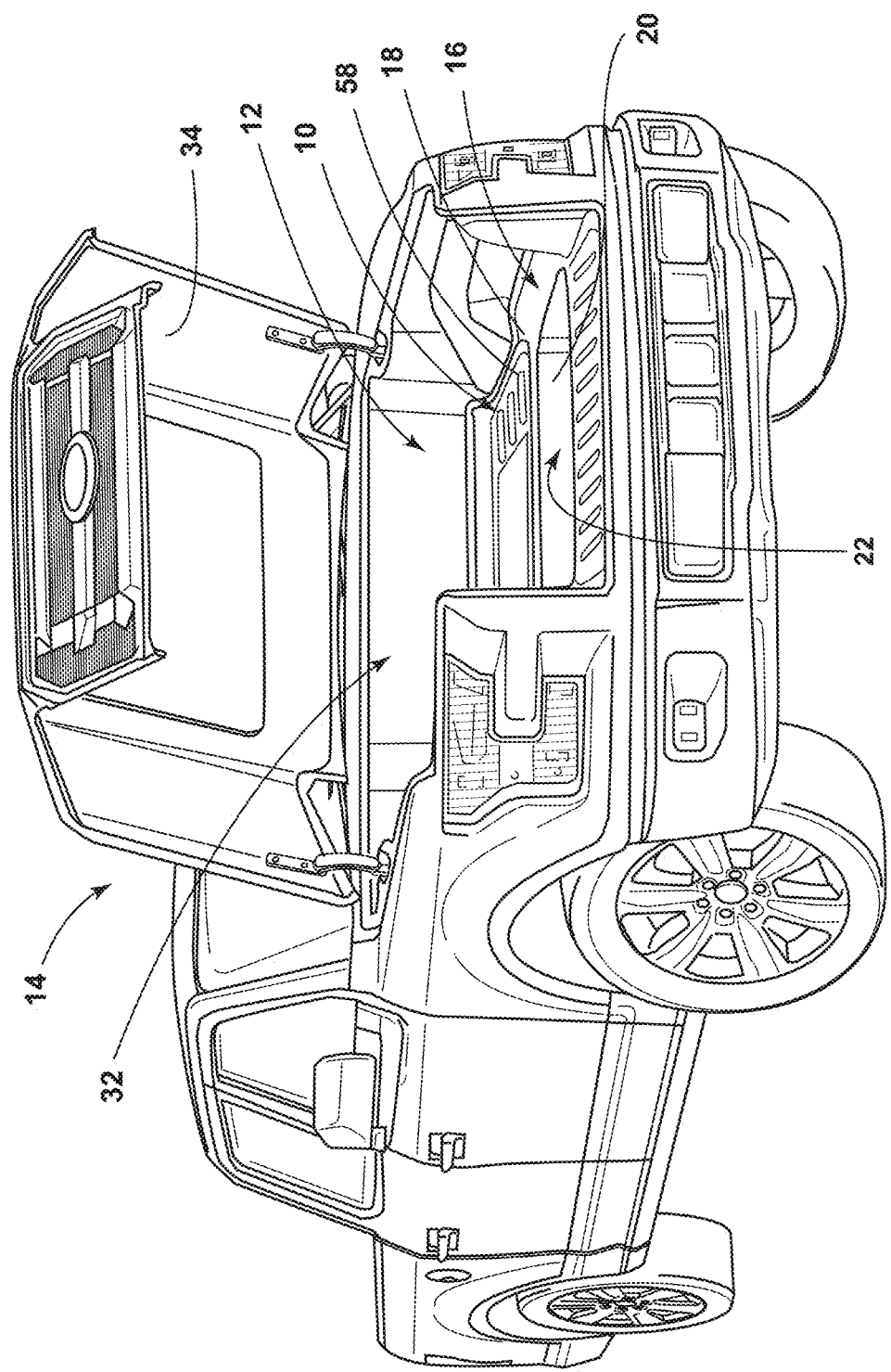
FIG. 1 is a perspective view of a vehicle, illustrating a cargo area at a front of the vehicle, according to one embodiment.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-9, a cargo divider assembly 10 for a cargo area 12 of a vehicle 14 is disclosed. The cargo divider assembly 10 includes a cargo area floor 16. The cargo area floor 16 includes an upper platform 18 and a recessed portion 20 that defines a storage compartment 22 that is adjacent to the upper platform 18. The recessed portion 20 includes a base 24 and a side wall 26. The side wall 26 extends vehicle-upward from the base 24 and defines first and second receiving slots 28. A lid 30 is operable between a cover position, wherein the lid 30 covers the storage compartment 22, a first divider position, wherein the lid 30 is received within the first receiving slot 28 and extends a first distance into the storage compartment 22, and a second divider position, wherein the lid 30 is received within the second receiving slot 28 and extends a second distance into the storage compartment 22 that is greater than the first distance.

Figure 2:
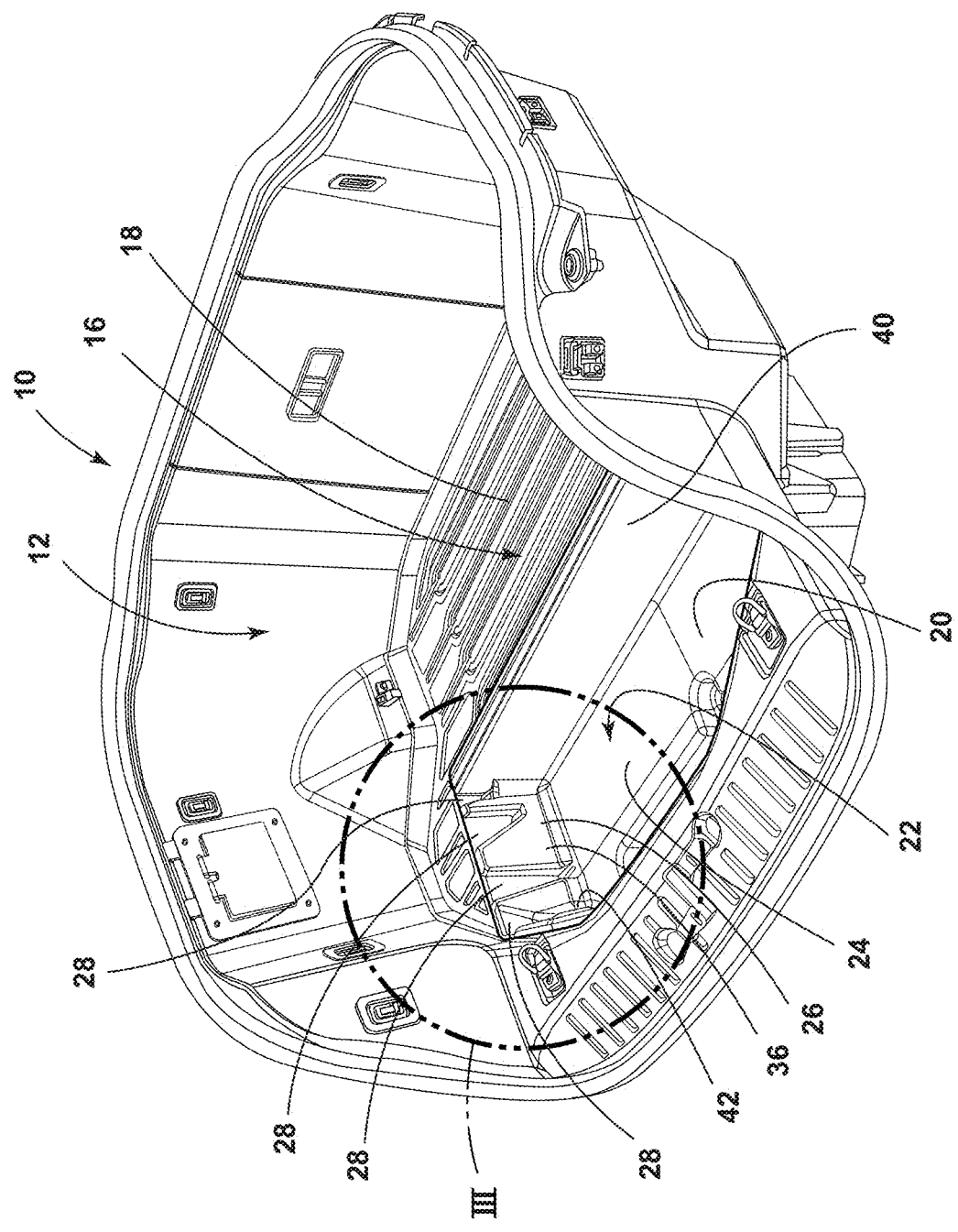
FIG. 2 is a perspective view of a cargo area that defines a storage compartment, according to one embodiment.
Figure 3:
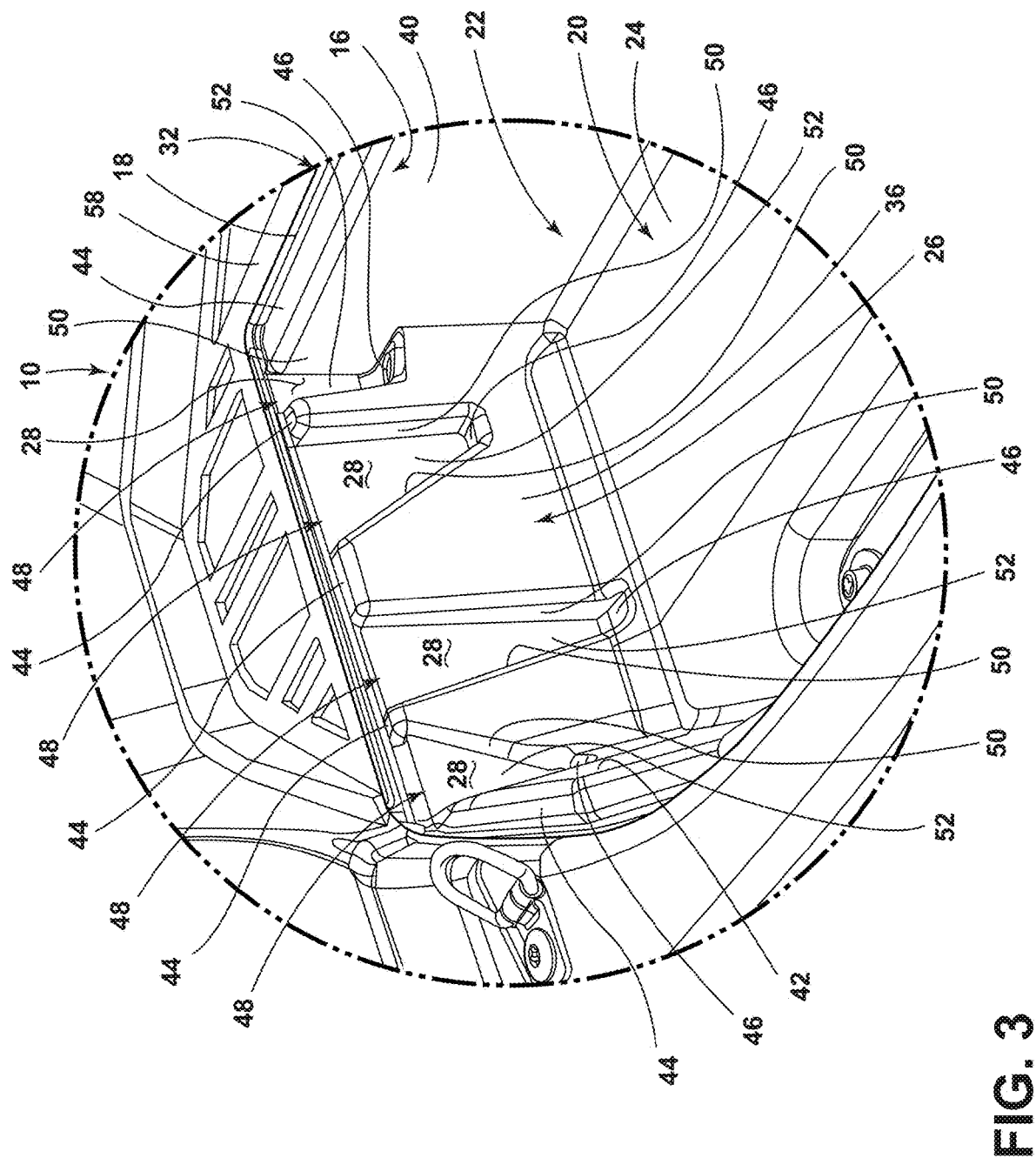
FIG. 3 is an enlarged view of portion III of the cargo area illustrated in FIG. 2, illustrating a plurality of receiving slots defined within the storage compartment, according to one embodiment.

Referring now to FIGS. 1-3, the vehicle 14 includes the cargo area 12. The cargo area 12 may be at least one of a variety of areas of the vehicle 14 generally designated for receiving cargo. For example, the cargo area 12 may include a rear trunk, or rear storage area, of the vehicle 14 that is generally accessible by opening a rear lift gate of the vehicle 14, in some embodiments. In the embodiment illustrated in FIG. 1, the cargo area 12 of the vehicle 14 is a front trunk 32 that is accessible by moving a hood 34 of the vehicle 14 to an open position, as illustrated in FIG. 1.

In various embodiments, a storage compartment 22 may be defined within the cargo area 12 of the vehicle 14. In some embodiments, the storage compartment 22 may be defined by a cargo area floor 16. As illustrated in FIGS. 2 and 3, the cargo area floor 16 includes an upper platform 18 and a recessed portion 20 that defines the storage compartment 22 adjacent to the upper platform 18 of the cargo area floor 16. The recessed portion 20 includes a base 24 and a side wall 26 that extends vehicle-upward from the base 24. In the embodiment illustrated in FIGS. 2-4, the side wall 26 extending upward from the base 24 includes first and second lateral portions 36, 38 that are opposite one another and first and second connecting portions 40, 42 that are opposite one another and extend between the first and second lateral portions 36, 38.

Figure 4:
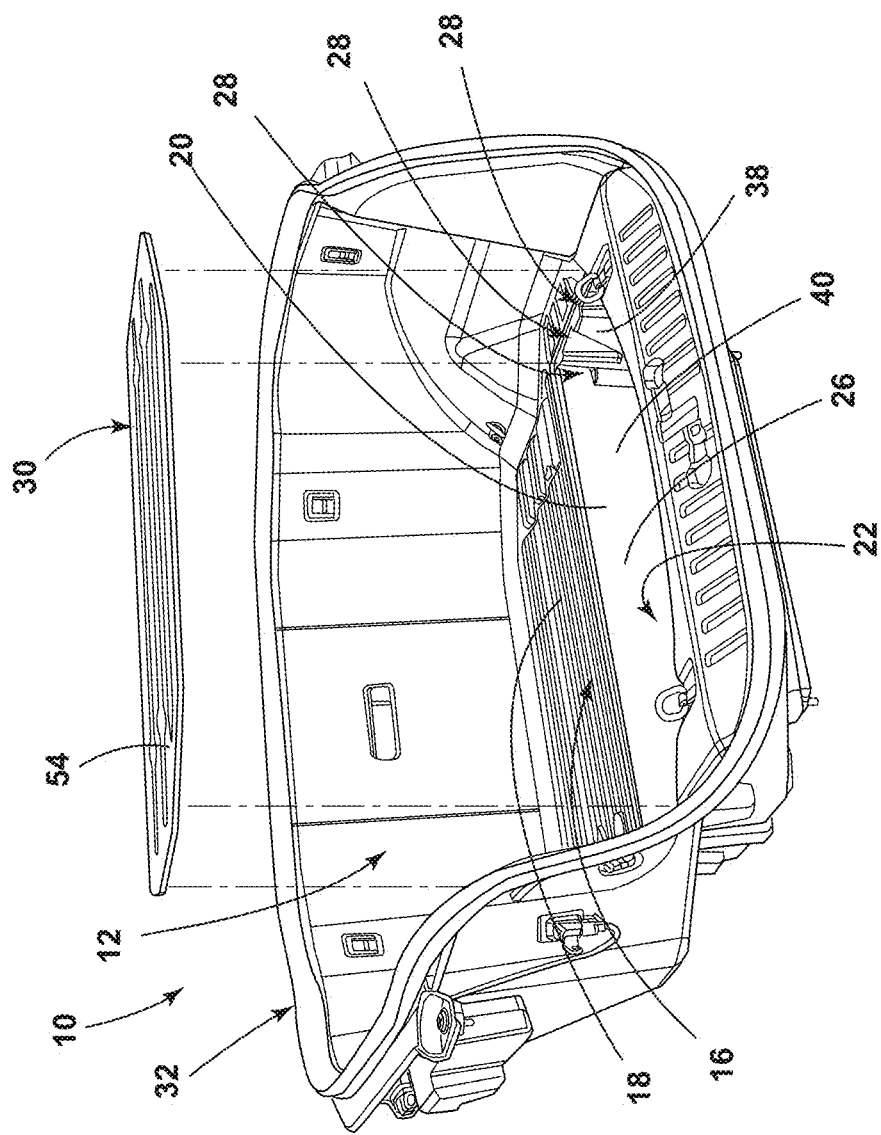
FIG. 4 is a perspective view of the cargo area, illustrating a lid configured to cover the storage compartment, according to one embodiment.

Referring now to FIGS. 2-4, in various embodiments, at least one receiving slot 28 may be defined within the storage compartment 22. In some embodiments, the at least one receiving slot 28 may be defined by the side wall 26 of the recessed portion 20 of the cargo area floor 16. For example, as illustrated in FIGS. 2 and 3, four receiving slots 28 are defined by the first lateral portion 36 of the side wall 26. Further, as illustrated in FIG. 4, a plurality of receiving slots 28 are defined by the second lateral portion 38 of the side wall 26. The receiving slots 28 defined by the second lateral portion 38 of the side wall 26 may correspond with the receiving slots 28 defined by the first lateral portion 36 of the side wall 26 to receive the lid 30 in one or more divider positions, as described further herein. As illustrated in FIG. 3, the at least one receiving slot 28 may extend generally downward from an upper shelf 44 to a slot bottom 46. In various embodiments, the upper shelf 44 may define and/or be adjacent to an upper opening 48 of the at least one receiving slot 28. In the embodiment illustrated in FIGS. 2 and 3, the upper shelf 44 extends generally around a perimeter of the storage compartment 22 and is interrupted by the plurality of receiving slots 28 defined by the side wall 26 of the recessed portion 20 of the cargo area floor 16. In some embodiments, the upper shelf 44 may be disposed further vehicle-downward than the upper platform 18. In other words, a plane of the upper shelf 44 may be vehicle-downward of a plane of the upper platform 18. It is contemplated that, in some embodiments, at least a portion of the upper shelf 44 may be planar with and/or a portion of the upper platform 18.

As illustrated in FIG. 3, the side wall 26 of the recessed portion 20 of the cargo area floor 16 is shaped to form generally opposing side surfaces 50 that extend from the upper shelf 44 to the slot bottom 46 and a rear surface 52 that extends between the opposing side surfaces 50. In such embodiments, the at least one receiving slot 28 is defined by the opposing side surfaces 50, the rear surface 52, and the slot bottom 46. As further illustrated in FIG. 3, the slot bottom 46 of the at least one receiving slot 28 may be disposed vehicle-upward of the base 24 of the recessed portion 20 of the cargo area floor 16. In other words, the side wall 26 may extend generally vehicle-upward away from the base 24 before reaching the slot bottom 46, in some embodiments. It is contemplated that the base 24 of the recessed portion 20 may form the slot bottom 46 of the at least one receiving slot 28, in some embodiments.

Referring still to FIGS. 2 and 3, in some embodiments, at least a first receiving slot 28 and a second receiving slot 28 may be defined within the storage compartment 22. In such embodiments, the first receiving slot 28 may terminate at a first slot bottom 46 and the second receiving slot 28 may terminate at a second slot bottom 46, wherein the first slot bottom 46 is further than the second slot bottom 46 from the base 24 of the recessed portion 20. For example, as illustrated in FIG. 3, the receiving slot 28 that is nearest to the first connecting portion 40 of the side wall 26 (i.e., a first receiving slot 28) extends downward into the storage compartment 22 and terminates at a first slot bottom 46, and the receiving slot 28 that is second nearest to the first connecting portion 40 of the side wall 26 (i.e., a second receiving slot 28) extends downward into the storage compartment 22 and terminates at a second slot bottom 46 that is nearer than the first slot bottom 46 to the base 24 of the recessed portion 20.

Figure 5:
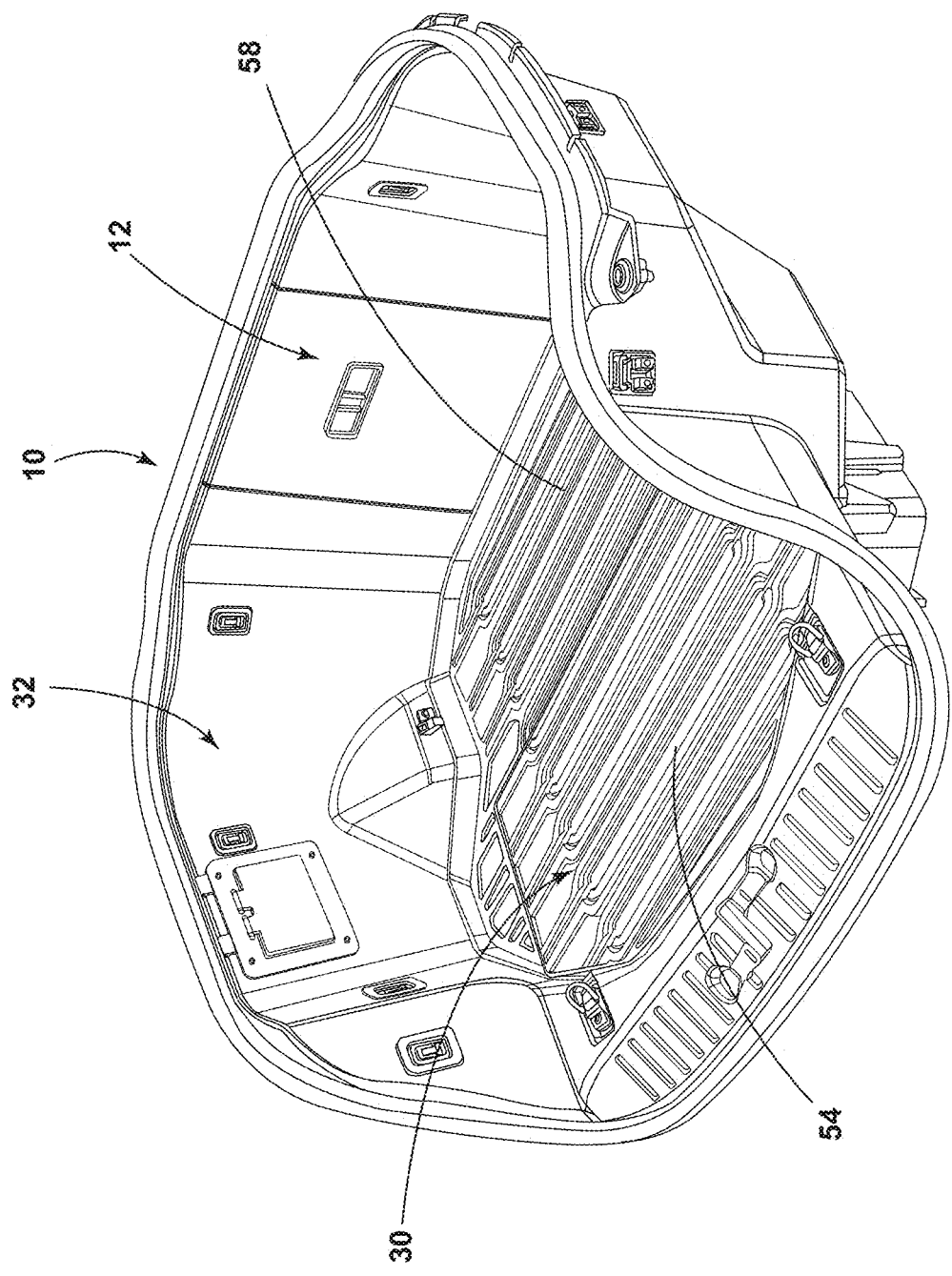
FIG. 5 is a perspective view of the cargo area, illustrating the lid in a cover position, wherein the lid covers the storage compartment, according to one embodiment.
Figure 6:
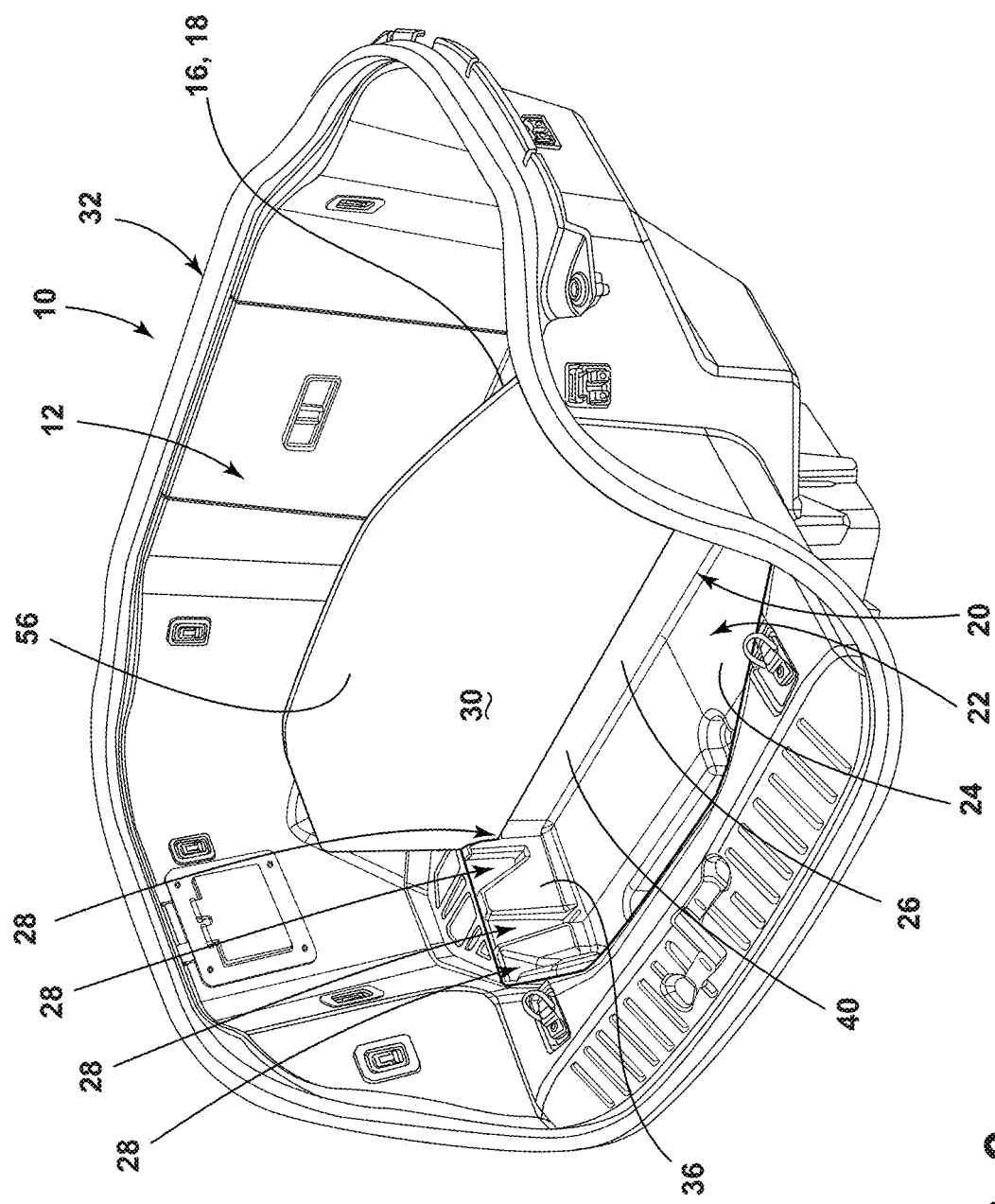
FIG. 6 is a perspective view of the cargo area, illustrating the lid in a divider position, wherein the lid is received within a receiving slot defined within the storage compartment, according to one embodiment.

Referring now to FIGS. 4-9, the cargo divider assembly 10 includes the lid 30. The lid 30 includes a top side 54 and a bottom side 56 that is opposite the top side 54. The lid 30 may be operable to cover the storage compartment 22 in a cover position, as illustrated in FIG. 5. In the cover position, the top side 54 of the lid 30 is positioned vehicle-upward of the bottom side 56 of the lid 30. In some embodiments, the upper shelf 44 of the cargo area floor 16 may be configured to support the lid 30 in the cover position. In such embodiments, the upper shelf 44 may provide a support ledge upon which one or more portions of the bottom side 56 of the lid 30 may rest when the lid 30 is in the cover position.

In some embodiments, the upper platform 18 of the cargo area floor 16 may align with the top side 54 of the lid 30 in the cover position of the lid 30. For example, the upper platform 18 may align with the top side 54 of the lid 30 by being generally and/or substantially planar with the top side 54 of the lid 30 when the lid 30 is in the cover position. In some embodiments, the upper platform 18 may align with the top side 54 of the lid 30, such that the upper platform 18 is generally and/or substantially flush with the portion of the top side 54 of the lid 30 that is adjacent to the upper platform 18 in the cover position of the lid 30. In some embodiments, a trim cover 58 may overlie at least a portion of the upper platform 18 of the cargo area floor 16, and the trim cover 58 may align with the top side 54 of the lid 30 in the cover position of the lid 30, as illustrated in FIG. 5. The trim cover 58 may be a variety of vehicle trim components configured to overlie the upper platform 18 of the cargo area floor 16 (e.g., fabric floor mat, rubberized insert, etc.), in various examples. In various embodiments, the upper platform 18 of the cargo area floor 16 and/or the trim cover 58 overlying the upper platform 18 may form a load floor in the cargo area 12 together with the top side 54 of the lid 30 when the lid 30 is in the cover position.

Referring still to FIGS. 4-9, in various embodiments, the lid 30 may be removable from the cover position, as illustrated in FIG. 4. Further, in various embodiments, the lid 30 may be operable between the cover position and at least one divider position. In the at least one divider position, the lid 30 may extend into the storage compartment 22 to generally divide the storage compartment 22 and/or the cargo area 12 into subsections. In various embodiments, the lid 30 is configured to be received within the at least one receiving slot 28 defined within the storage compartment 22 in the at least one divider position. In some embodiments, the lid 30 may be operable between the cover position and a plurality of divider positions. For example, in the embodiment illustrated in FIGS. 6-9, the lid 30 is operable to enter four divider positions via reception of the lid 30 within each of the four receiving slots 28 defined by the first lateral portion 36 of the side wall 26 that defines the storage compartment 22. Although not illustrated in FIGS. 6-9, the lid 30 may also be received within the receiving slots 28 defined by the second lateral portion 38 of the side wall 26 that correspond with the four receiving slots 28 defined by the first lateral portion 36 of the side wall 26, as described above, when the lid 30 is in the four divider positions illustrated in FIGS. 6-9.

Figure 7:
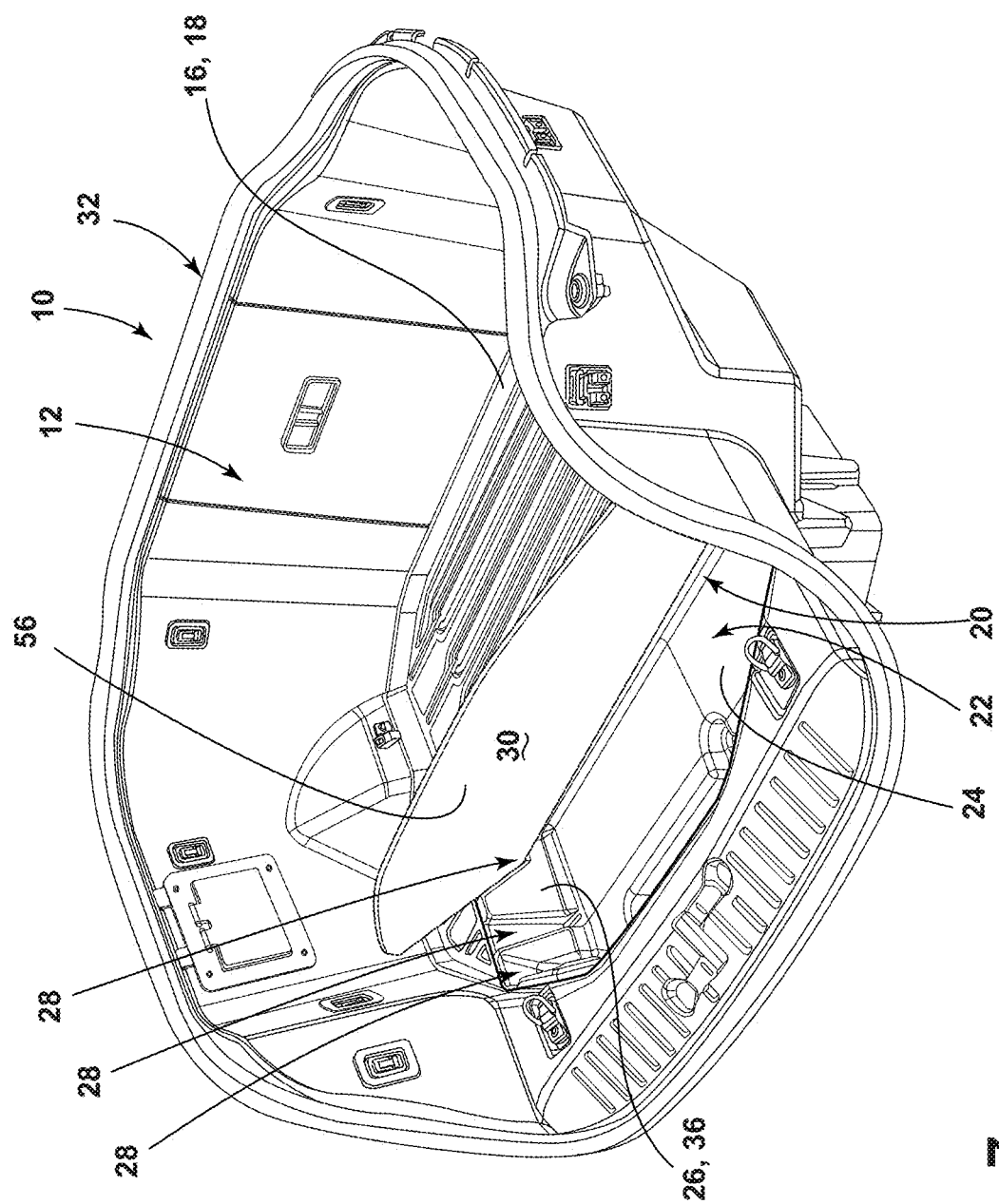
FIG. 7 is a perspective view of the cargo area, illustrating the lid in a divider position, wherein the lid is received within a receiving slot defined within the storage compartment, according to one embodiment.
Figure 8:
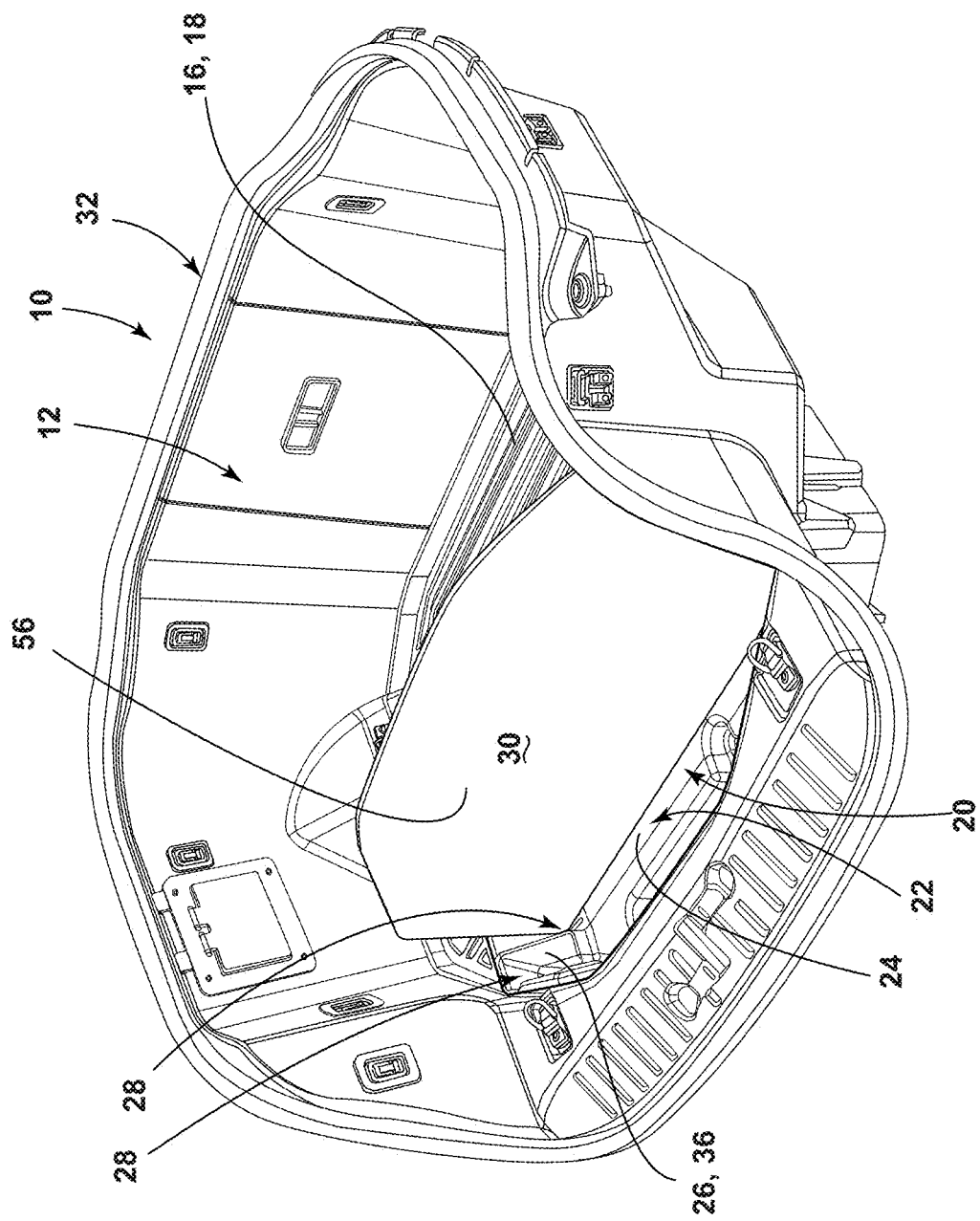
FIG. 8 is a perspective view of the cargo area, illustrating the lid in a divider position, wherein the lid is received within a receiving slot defined within the storage compartment, according to one embodiment.

In some embodiments, the lid 30 may be oriented at an angle within the at least one receiving slot 28 while in the at least one divider position, such that one of the top side 54 and the bottom side 56 of the lid 30 faces a vehicle-downward direction. In some embodiments, the vehicle-downward direction includes one of a vehicle-rearward component and a vehicle-forward component. For example, in the embodiment illustrated in FIG. 7, the lid 30 is received within the receiving slot 28 that is second nearest to the first connecting portion 40 of the side wall 26, and the lid 30 rests against the sloped interior surface of the receiving slot 28, such that the bottom side 56 of the lid 30 faces the vehicle-downward direction. When the cargo area floor 16 illustrated in FIG. 7 is coupled to the vehicle 14, as illustrated in FIG. 1, the first connecting portion 40 of the side wall 26 is vehicle-rearward of the second connecting portion 42 of the side wall 26. As such, the vehicle-downward direction that the bottom side 56 of the angled lid 30 faces in FIG. 7 includes a vehicle-forward component.

Referring still to FIGS. 6-9, in some embodiments, wherein at least a first receiving slot 28 and a second receiving slot 28 are defined within the storage compartment 22, the lid 30 may be operable between a first divider position, wherein the lid 30 is received within the first receiving slot 28 and extends a first distance into the storage compartment 22, and a second divider position, wherein the lid 30 is received within the second receiving slot 28 and extends a second distance into the storage compartment 22 that is greater than the first distance. For example, in the embodiment illustrated in FIGS. 6-9, the lid 30 is illustrated in a first divider position in FIG. 6, wherein the lid 30 is received within the receiving slot 28 that is nearest to the first connecting portion 40 of the side wall 26 (i.e., a first receiving slot 28) and extends a first distance into the storage compartment 22, and the lid 30 is illustrated in a second divider position in FIG. 8, wherein the lid 30 is received within the receiving slot 28 that is third nearest to the first connecting portion 40 of the side wall 26 (i.e., a second receiving slot 28) and extends into the storage compartment 22 a second distance that is greater than the first distance.

Figure 9:
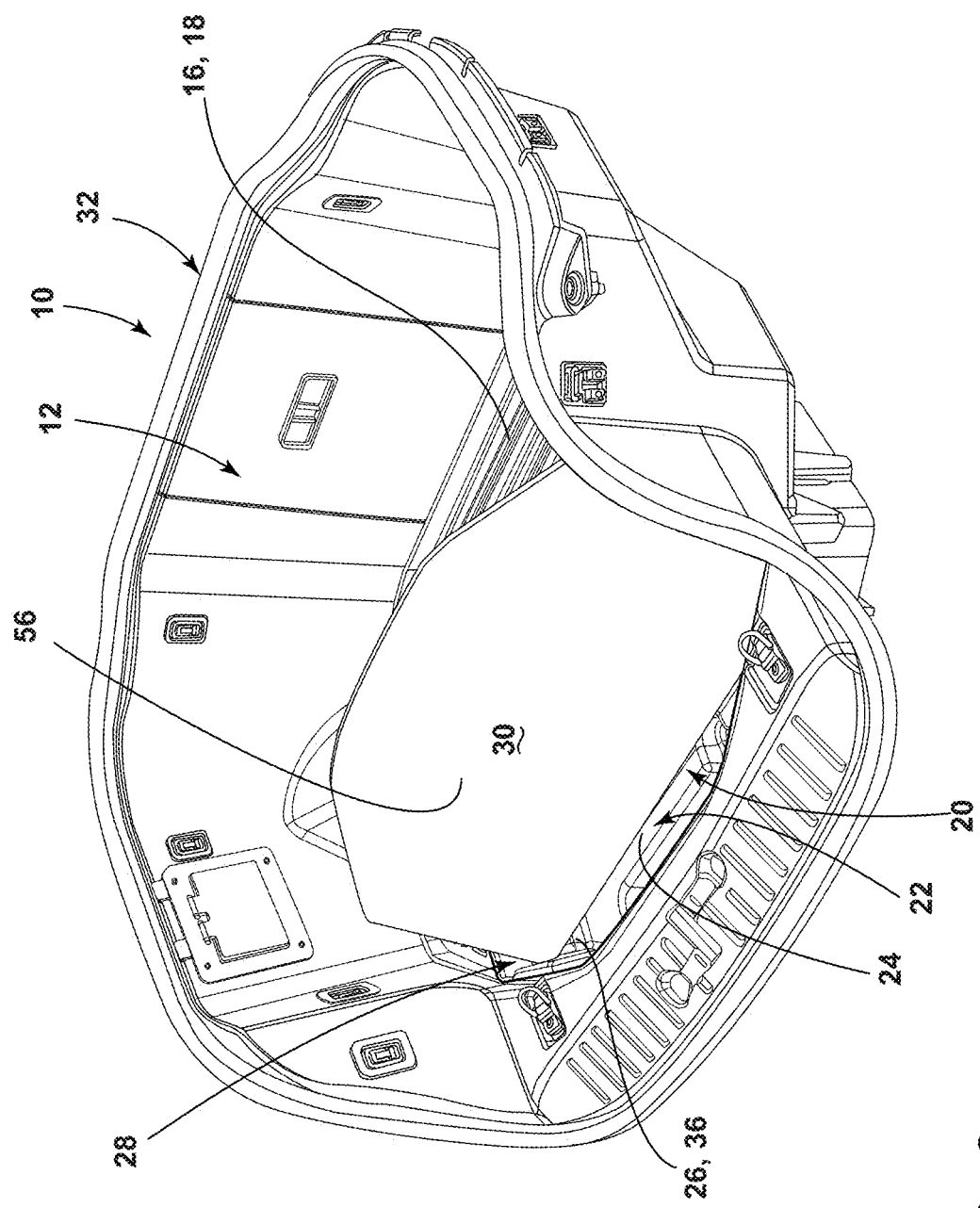
FIG. 9 is a perspective view of the cargo area, illustrating the lid in a divider position, wherein the lid is received within a receiving slot defined within the storage compartment, according to one embodiment.

In some embodiments, the lid 30 is operable between a first divider position, wherein the lid 30 is received within a first receiving slot 28 and oriented at an angle, such that one of the top side 54 and the bottom side 56 of the lid 30 faces a first vehicle-downward direction, and a second divider position, wherein the lid 30 is received within a second receiving slot 28 and oriented at an angle, such that one of the top side 54 and the bottom side 56 of the lid 30 faces a second vehicle-downward direction. For example, in the embodiment illustrated in FIGS. 6-9, the lid 30 is operable between a first divider position, as shown in FIG. 9, wherein the lid 30 is received within the receiving slot 28 that is furthest from the first connecting portion 40 of the side wall 26 (i.e., a first receiving slot 28) and oriented at an angle, such that the top side 54 of the lid 30 faces a first vehicle-downward direction that has a vehicle-rearward component, and a second divider position, as shown in FIG. 7, wherein the lid 30 is received within the receiving slot 28 that is second nearest to the first connecting portion 40 of the side wall 26 (i.e., the second receiving slot 28) and oriented at an angle therein, such that the bottom side 56 of the lid 30 faces a second vehicle-downward direction that includes a vehicle-forward component.

In operation of an exemplary embodiment of the cargo divider assembly 10, a user may initially have the lid 30 in the cover position, such that the storage compartment 22 in the cargo area 12 of the vehicle 14 is covered and the lid 30 forms a load floor together with the upper platform 18 of the cargo area floor 16 for storing items thereon. Upon wishing to divide the storage compartment 22 and/or the cargo area 12 into subsections, the user may remove the lid 30 from the cover position and reposition the lid 30 in at least one of a plurality of divider positions by sliding the lid 30 into the at least one receiving slot 28 defined within the storage compartment 22.

The cargo divider assembly 10 described herein may provide a variety of advantages. First, in the cover position, the lid 30 may conveniently cover the storage compartment 22 and serve as a portion of the load floor of the cargo area 12. Second, the lid 30 being operable to divide the storage compartment 22 and/or the cargo area 12 in the at least one divider position may enable a user to customize the storage space within the cargo area 12 without aftermarket components. Third, the at least one receiving slot 28 being defined by the side wall 26 of the recessed portion 20 of the cargo area floor 16 may allow the lid 30 to be retained in the at least one divider position without the addition of aftermarket components.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A cargo divider assembly for a cargo area of a vehicle, comprising:
   a cargo area floor having an upper platform and a recessed portion that defines a storage compartment adjacent to the upper platform, the recessed portion comprising:
   a base; and
   a side wall extending vehicle-upward from the base, wherein the side wall defines first and second receiving slots; and
   a lid operable between a cover position, wherein the lid covers the storage compartment, a first divider position, wherein the lid is received within the first receiving slot and extends a first distance into the storage compartment, and a second divider position, wherein the lid is received within the second receiving slot and extends a second distance into the storage compartment that is greater than the first distance.

2. The cargo divider assembly of claim 1, wherein the first receiving slot terminates at a first slot bottom and the second receiving slot terminates at a second slot bottom.

3. The cargo divider assembly of claim 2, wherein the first slot bottom is further than the second slot bottom from the base of the recessed portion.

4. The cargo divider assembly of claim 3, wherein the second slot bottom is disposed vehicle-upward of the base of the recessed portion.

5. The cargo divider assembly of claim 2, wherein the first receiving slot extends from the first slot bottom to an upper shelf that is configured to support the lid in the cover position.

6. The cargo divider assembly of claim 5, wherein the upper shelf is disposed further vehicle-downward than the upper platform.

7. The cargo divider assembly of claim 1, wherein the upper platform aligns with a top side of the lid in the cover position of the lid.

8. The cargo divider assembly of claim 1, further comprising:
   a trim cover that overlies the upper platform of the cargo area floor, wherein the trim cover aligns with a top side of the lid in the cover position of the lid.

9. The cargo divider assembly of claim 1, wherein the lid includes a top side and a bottom side opposite the top side, and wherein the top side is positioned vehicle-upward of the bottom side in the cover position of the lid, at least a portion of the top side faces the base of the recessed portion in the first divider position, and the bottom side faces away from the base of the recessed portion in the first divider position.

10. The cargo divider assembly of claim 1, wherein the cargo area is a front trunk of the vehicle.

11. A cargo divider assembly for a cargo area of a vehicle, comprising:
   a storage compartment defined within the cargo area;
   first and second receiving slots defined within the storage compartment; and
   a lid operable between a cover position, wherein the lid covers the storage compartment, a first divider position, wherein the lid is received within the first receiving slot and extends a first distance into the storage compartment, and a second divider position, wherein the lid is received within the second receiving slot and extends a second distance into the storage compartment that is greater than the first distance.

12. The cargo divider assembly of claim 11, wherein the storage compartment is defined by a recessed portion of a cargo area floor that comprises a base and a side wall extending vehicle-upward from the base, wherein the first and second receiving slots are defined by the side wall.

13. The cargo divider assembly of claim 12, wherein the cargo area floor further comprises an upper platform adjacent to the recessed portion.

14. The cargo divider assembly of claim 12, wherein the first receiving slot terminates at a first slot bottom and the second receiving slot terminates at a second slot bottom, wherein the first slot bottom is further than the second slot bottom from the base of the recessed portion.

15. A cargo divider assembly for a cargo area of a vehicle, comprising:
- a storage compartment defined within the cargo area;
- a first receiving slot defined within the storage compartment; and
- a lid having a top side and a bottom side and being operable between a cover position, wherein the lid covers the storage compartment and the top side is disposed vehicle-upward of the bottom side, and a first divider position, wherein the lid is received within the first receiving slot, extends a first distance into the storage compartment, and is oriented at an angle such that one of the top side and the bottom side faces a first vehicle-downward direction.

16. The cargo divider assembly of claim 15, wherein the first vehicle-downward direction includes one of a vehicle-rearward component and a vehicle-forward component.

17. The cargo divider assembly of claim 15, further comprising:
- a second receiving slot defined within the storage compartment, wherein the lid is operable between the cover position, the first divider position, and a second divider position, wherein the lid is received within the second receiving slot and extends a second distance into the storage compartment.

18. The cargo divider assembly of claim 17, wherein the second distance is greater than the first distance.

19. The cargo divider assembly of claim 17, wherein, in the second divider position, the lid is angled such that one of the top side and the bottom side faces a second vehicle-downward direction.

20. The cargo divider assembly of claim 19, wherein the top side faces the first vehicle-downward direction in the first divider position, and the bottom side faces the second vehicle-downward direction in the second divider position.

* * * * *